(12) United States Patent
Howe

(10) Patent No.: US 6,876,855 B1
(45) Date of Patent: Apr. 5, 2005

(54) USE OF LAND-BASED UNIT TO PROVIDE DELIVERY PATH OPTIMIZATION TO WIRELESS MOBILE UNIT

(75) Inventor: Walter Wesley Howe, Alpharetta, GA (US)

(73) Assignee: GTE Wireless Incorporated, New York, NY (US)

(*) Notice: Subject to any disclaimer, the term of this patent is extended or adjusted under 35 U.S.C. 154(b) by 0 days.

(21) Appl. No.: 09/460,174

(22) Filed: Dec. 10, 1999

(51) Int. Cl.[7] ............................................. H04Q 7/20
(52) U.S. Cl. ................................. 455/445; 455/432.1
(58) Field of Search ........................... 455/445, 433, 455/426.1, 432.1, 432.2, 432.3, 417, 461; 370/352, 353, 354, 355, 356, 351, 360; 379/221, 9, 913; 709/227, 228, 242

(56) References Cited

U.S. PATENT DOCUMENTS

| | | | | |
|---|---|---|---|---|
| 5,636,209 A | * | 6/1997 | Perlman | 370/281 |
| 5,724,658 A | * | 3/1998 | Hasan | 455/445 |
| 5,889,774 A | * | 3/1999 | Mirashrafi et al. | 370/352 |
| 5,978,677 A | * | 11/1999 | Sawyer | 455/432 |
| 5,991,621 A | * | 11/1999 | Alperovich | 455/433 |
| 6,075,783 A | * | 6/2000 | Voit | 370/352 |
| 6,078,575 A | * | 6/2000 | Dommety et al. | 370/338 |
| 6,466,571 B1 | * | 10/2002 | Dynarski et al. | 370/352 |

* cited by examiner

Primary Examiner—Nay Maung
Assistant Examiner—Tanmay Lele
(74) Attorney, Agent, or Firm—Leonard C. Suchtya, Esq.; Joel Wall, Esq.; Rader, Fishman & Grauer

(57) ABSTRACT

A system for optimizing the routing of a call originated from a land-based terminal (43) to a wireless mobile terminal (47) utilizing the interaction between a server controlled Internet protocol network (45) and the home location register (53) for the number assigned to the mobile terminal. In response to a call request by the server, the home location register identifies the visited location register (57) in contact with the mobile terminal and obtains a temporary local directory number of the local serving switch (63) in contact with a mobile data unit (51) connected to the mobile terminal. The server then uses the temporary local directory number to reach a data unit (70) on the network, which is used to place a local call over the public switched telephone network (72) to the serving switch. The serving switch, using the number assigned by the visited location register, obtains the correct cell site (87) and modem identification number that the server controlled IP-network needs to complete the call to the mobile terminal. The public switched telephone network is only used once to make a local call to the visited switch, minimizing the fee for use of the public switched telephone network.

24 Claims, 2 Drawing Sheets

USE OF LAND-BASED UNIT TO PROVIDE DELIVERY PATH OPTIMIZATION TO WIRELESS MOBILE UNIT

FIELD OF THE INVENTION

The present invention relates to the routing optimization of wireless communications from a land-based terminal to a mobile terminal using an alternative non-public switch telephone network that is connected between the land-based terminal and a data unit such as a modem. The data unit then makes a local phone call to a local serving switch in contact with the mobile terminal to complete the connection.

BACKGROUND OF THE INVENTION

It is known to activate a wireless data terminal by connecting a mobile terminal such as a notebook computer or personal data device to a specialized data unit such as a mobile modem. The mobile modem has associated wireless mobile telephone capabilities or a separate mobile phone to which it is connected and acts as a mobile data unit. A uniquely identified communication link between a land-based based terminal such as a desktop computer connected with a hard-wired data unit such as a modem and the mobile data unit can be made by using the mobile identification number ("MIN") of the mobile modem. Thus, the current art requires one hard-wired modem and one hard-wired telephone circuit per land-based terminal.

In a hard-wired telephone network a specific telephone number is associated with only one serving switch, located at a specific geographic location. In a wireless network a specific mobile number for a mobile data unit may be served by any single one of a vast number of available switches depending on the specific geographic location of the mobile data unit at the time a call is made. Such portability of use is one of the basic hallmarks of wireless telephony.

In the present implementation of wireless networks, each mobile number is associated by both the wireless and hard-wired networks with a specific geographic home switch location. The home switch location includes a physical connectivity matrix and a stored program control section that houses the logic and algorithms necessary to control the connectivity. Associated with wireless switches is a collection of Radio Frequency (RF) channels, aggregated in multiple physical locations called cell sites across a specific area corresponding to a serving market and variously known in the United States by the acronyms MSA, RSA, MTA, and BTA, depending on the FCC license A pair of entities known as the Home Location Register ("HLR") and Visited Location Register ("VLR") have been defined by the American National Standards Institute ANSI-41 standard, together with a set of protocols for communication between switches, which allows seamless roaming, or call delivery, to be made. In the present art, the VLR is associated with the wireless switch where a mobile unit is currently being served, and the HLR is associated with the switch where the mobile unit phone number "resides" (the geographic location where all hard-wired originated call will be directed before being routed to a wireless switch with which the mobile unit is in communication).

Typically, when the VLR and HLR are physically in the same location, the mobile unit is "Home" and is not roaming. When the VLR and the HLR are not in the same location and specialized protocols are not implemented to make the mobile phone act as if it were "home", then the mobile unit is "roaming".

Phone calls from a land-based terminal to a mobile terminal can be completed while roaming only by a carefully orchestrated set of interactions between the HLR and VLR, all of which are described and defined by ANSI-41. ANSI-41 defines the HLR as a logically and possibly physically separate device from the actual switching matrix underlying the RF portion of the wireless network for the home location of the mobile unit. Similarly, the VLR is defined as a logically and possibly physically separate device from the actual switching matrix underlying the RF portion of the wireless network from which a mobile unit is currently being served. This physical separation, together with the Signaling System Seven (SS7) and the associated messages and protocols are existing underlying components utilized by the invention.

The mobile numbers associated with the mobile data unit are ones for which no physical geographic location have been assigned. They may be standard numbering plan numbers or non-standard (not normally dialable) numbers. The numbers will be placed in a HLR database by which they can be interacted with from the current VLR location by a mobile phone. Since the HLR used by this invention has no associated switching matrix, all mobile stations are always in a roaming state active (since the HLR and VLR cannot coexist).

A mobile unit makes its presence known, either by Power-on Registration, Autonomous Registration, a Call Attempt or any other means.

For the purpose of illustration, in the existing art, a call placed from a hard-wired land-based terminal to a mobile terminal is routed from the serving hard-wired switch to the HLR for the mobile unit associated with the mobile terminal using the public switch telephone network ("PSTN"), possibly by way of additional local or inter-exchange carrier ("IXC") switches.

The HLR interacts with the VLR to obtain a temporary local directory number ("TLDN") from the allocations made for the physical location of the serving switch connected to the mobile unit. The switch containing the HLR then again routes the call by way of the public switch telephone network to the switch containing the VLR, which then establishes the necessary wireless RF connection to the mobile unit. Thus, two separate public switched network connections are required to complete a single Land-to-Mobile call while roaming., FIG. 1 illustrates the current state of the call delivery method for a land-based hard-wired originated call in more detail. In this figure, a land-based terminal 3 is connected to a hard-wired data unit 5 such as a modem, which is in turn connected by a wire 7 to an end office switch 9. Switch 9 originates a call to a mobile terminal 11 such as a notebook computer to a mobile modem or a mobile modem/phone combination acting as a mobile data unit 13. The end office 9, using predefined algorithms and data routes the call to the public switch telephone network/inter-exchange carrier switches ("PSTN/IXC") 15 over existing connectivity 17. The PSTN/IXC 15 routes the call to the home cellular switch 19, the geographic home of the number associated with mobile unit 13, by way of existing connectivity 18. The home cellular switch 19 sends a routing request to the home location register 23, which consults its internal database and determines the last known location of the mobile station 11 in a particular visited location register (VLR) 25. VLR 25 is one of multiple possible such registers.

HLR 23 sends a routing request 27 to VLR 25, possibly routed by way of one or more signal transfer points ("STP")

29. The VLR 25 determines that the call is deliverable and allocates a temporary local directory number (TLDN) from a pool of numbers whose geographic base is the serving switch 31. The TLDN is returned using existing connectivity 30 to the HLR 23, again possibly routed by way of one or more regional transfer points 29. The HLR 23 then forwards the TLDN to the home mobile switch 19 in the response to the routing request by route 35.

The home mobile switch 19 passes the TLDN on to a second PSTN/IXC 37 for delivery to the serving switch 31 associated with the VLR 25 where the mobile unit 13 is located. The serving switch 31 sends a routing request 39 to VLR 25. The VLR 25 associates the TLDN previously allocated with the mobile data unit 13 and passes the information back to serving switch 31 using response route 41. Serving switch 31 is now able to connect the incoming call to the mobile unit 13 and mobile terminal 11 by way of the correct cell site 42. The mobile unit 13 and mobile terminal 11 can now communicate with land-based terminal 3 through hard-wired data unit 13.

It should be noted in FIG. 1 that two separate PSTN/IXC connections are required for call delivery.

SUMMARY OF THE INVENTION

In accordance with the present invention an improved telephone system is provided that reduces the cost of making a land-based hard-wired data call from a land-based terminal to a mobile data unit attached to a mobile terminal such as a notebook computer by reducing or eliminating the use of the, for fee, public switched telephone system (PSTN).

In the improved telephone system, an alternate network not associated with the PSTN can initiate a call to the mobile terminal through the home location register (HLR) of the telephone number associated with the mobile data unit attached to the mobile terminal. In a preferred embodiment, the alternate network is based on the Internet protocol and a server on the alternate network actually initiates the call request. On receiving the call request, the HLR searches its internal database to determine the visited location register (VLR) last in contact with the mobile terminal. The HLR contacts the VLR and asks for the identity of the serving switch last in contact with the mobile terminal. The VLR searches for the serving switch and assigns to it a temporary local directory number (TLDN). The VLR sends the TLDN to the HLR, which forwards the TLDN to the server. The server examines the NPA-NXX (a national uniform numbering system) structures of the TLDN.

Associated with the alternate network is a pool of data units such as modems connected to the PSTN at various remote geographic regions. Each data unit has a phone number associated with it. Preferably, the server compares the NPA-NXX of the TLDN with the NPA-NXX of the available data units to determine to identify a specific local data unit to use. The server then contacts the data-unit to initiate a local call through the serving switch, which then contacts the VLR and asks for the route to the mobile terminal. The VLR uses the TLDN to give the route and the call is completed between the land-based hard-wired terminal and the mobile terminal. In contrast to the prior art, the improved system is able to set up a call with only a local call through the PSTN, reducing PSTN carrying and routing fees.

DETAILED DESCRIPTION

Figure 1:
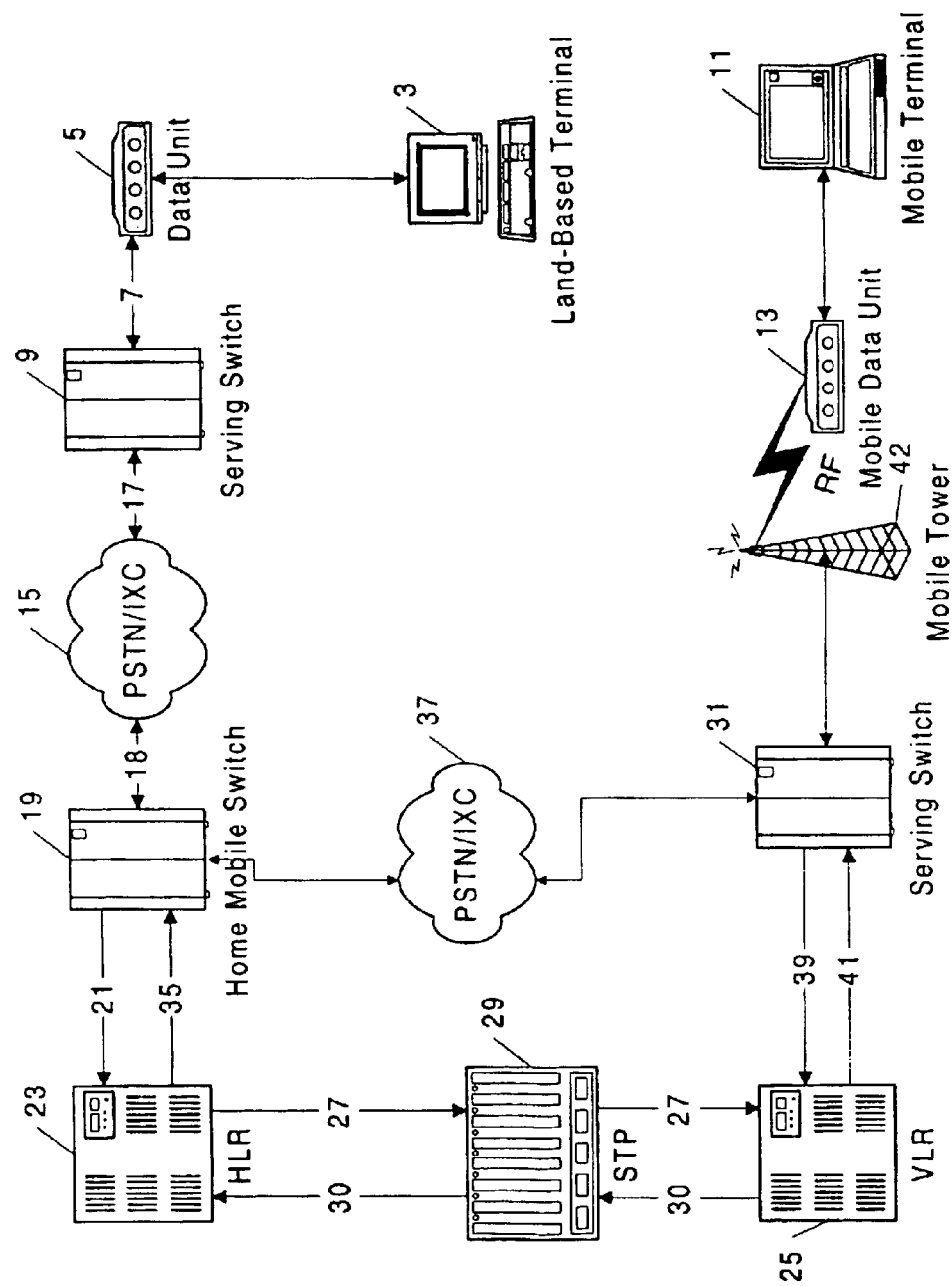
FIG. 1 shows the components currently used to complete a land-based hard-wired data unit call to a wireless mobile unit using two public switched telephone network connections.

The present invention provides call routing optimization between a land-based call originating terminal 43 and a mobile terminal 47 by interfacing the land-based terminal with an alternate network 45 such as a Transmission Control Protocol/Internet Protocol ("TCP/IP") network with one or more servers 49. To uniquely identify a mobile terminal 47, server 49 preferably associates the identity of the mobile terminal 47 with the mobile identification number ("MIN") of the mobile data unit 51 it is connected to. Mobile data unit 51 is either a wireless data unit such as a modem with phone capabilities or a wireless data unit such as a modem with a separate mobile phone.

Using ANSI 41 protocols, to establish a data connection between land-based terminal and mobile terminal 47, a location request 52 is passed from server 49, via a signaling system seven (SS7) to the HLR 53 associated with the specific mobile data unit 51, possibly by way of one or more signal transfer points 55. The HLR 53 consults its internal database and determines that the last known connection to the mobile terminal 47 was through a specific VLR 57.

HLR 53 sends a routing request 59 to VLR 57, possibly routed by way of one or more signal transfer points ("STP") 61. VLR 57 determines that the call is deliverable and allocates a temporary local directory number (TLDN) from a pool of numbers whose geographic base is serving switch 63 in communication with mobile terminal 47. The TLDN is returned in response to the routing request by pathway 65 to the HLR 53. HLR 53 then forwards the TLDN to network server 49 as a response 67 to the location request 52.

Call path optimization is accomplished by using ANSI-41, the North American standard for cellular telecommunications interruption operations, to interface between the server 49 and the HLR 53. In turn, network server 49 uses its communication link 69 with alternate network 45 to select an appropriate data unit 70 such as a modem from a geographically disposed pool 71 of such units. Data units 70 are interconnected between the alternate network 45 and the public switch telephone network/Inter-exchange switches ("PSTN/IX") 72 at discrete remote geographic locations.

Figure 2:
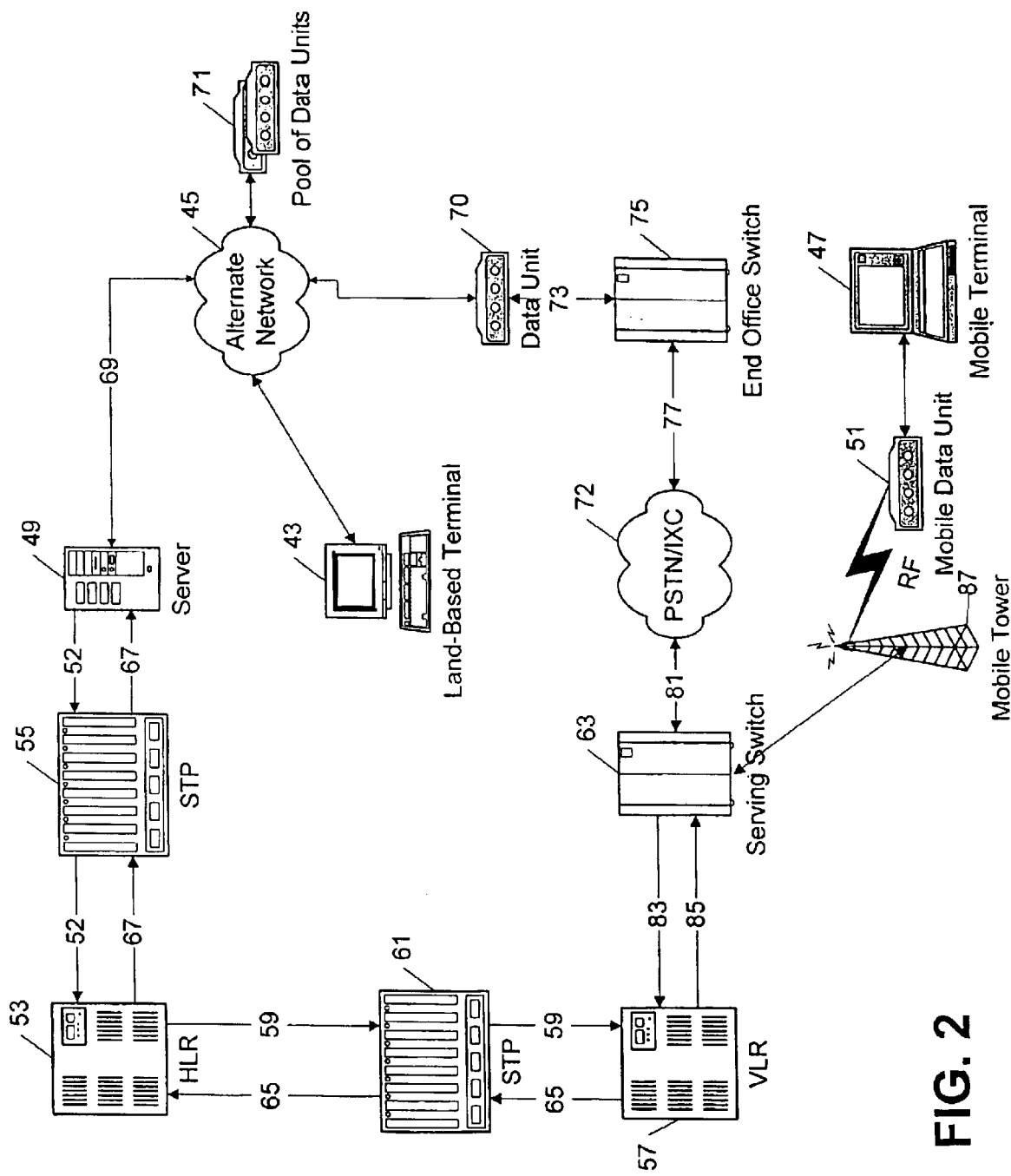
FIG. 2 shows the components of the present inventive system in which an alternative network with an associated server can be used to limit or eliminate the use of the public switched telephone network.

As shown in FIG. 2, data unit 70 is connected by a telephone line 73 to an end office switch 75, which in turn is connected to PSTN/IX 72 by a second data line 77. The PSTN/IC 72 is interconnected with serving switch 63 by telephone line 81.

Server 49 chooses an appropriate data unit 70 from the pool 71 that is local to the physical location of the mobile terminal 47. It typically does this by examining the NPA-NXX number format of the TLDN and comparing it with the phone number connection between a unit 70 and its connection to PSTN/IX. 72. Through judicious selection of a data unit 70 based on the TLDN, the connection made between end office switch 75 and mobile unit serving switch 63 is a local call represented by local PSTN elements 73 through 81.

The serving switch 63 sends a routing request 83 to VLR 57. VLR 57 then associates the TLDN previously allocated with the data unit 51 and passes the MIN shown by route 85 in the response to the routing request. The serving switch 63 is now able to connect the incoming call to the data unit 51 by way of the correct cell site 87. When the data unit 51 detects the incoming call, it connects the call to the mobile terminal 47 completing the connection requested from fixed terminal 43.

A key advantage of the present invention is that only one local PSTN connection of a local nature is used to complete the call. Another key advantage is that a data unit 70 of a pool 71 of such units allows many land-based terminals 43 to use the system on a shared basis.

These advantages are accomplished on a real time basis to allow a call to be routed directly to a mobile terminal 47 from a remote land-based terminal 43 by a unique interfacing of network elements. Central to this interfacing is the connection between VLR 57 and HLR 53 and in turn between HLR 53 and server 49. Further optimization is then applied by selecting the data unit 70 that is "local" to the serving mobile switch 63 and routing the data flow between the land-based terminal 43 and the locally disposed data unit 70 using the connection set up by server 49 with the modem. Thus, in place of two long-distance connections shown in prior art FIG. 1, a single local connection is used.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

What is claimed is:

1. A communication system that provides an optimum connector path between a first land based hard-wired terminal and a mobile data unit comprising:

means for said first land based hard-wired terminal to locate a serving switch of a wireless communication system that was last in contact with said mobile data unit wherein said first land based hard-wired terminal does not communicate first with a second land based bard-wired terminal;

means for assigning a temporary local directory number to said serving switch; and means for communicating with said mobile data unit including a bard-wired data unit being connected to an alternate non-public switched telephone network and to the public switch telephone network at a location local to said serving switch and dialing said temporary local directory number to activate a connection with said serving switch, thereby establishing a communication link between said fit land based hard-wired terminal and said mobile data unit.

2. A communication system as set forth in claim 1, wherein said locating means includes a database in which the identity of the visited location register last in contact with the mobile data unit is stored.

3. A communication system as set forth in claim 1, wherein said assigning means assigns a temporary local directory number based on the geographic location of said serving switch.

4. A communication system as set forth in claim 3, wherein said temporary local directory number is used to select said hard-wired data unit from a pool of geographically disposed hard-wired data units by comparing characteristics of said temporary local directory number with characteristics of each phone number associated with each said hard-wired data unit on said public switch telephone network.

5. A communication system as set forth in claim 1, wherein said communicating means includes a server for controlling communication through said alternate non-public switched telephone network.

6. A communication system as set forth in claim 5, wherein said alternate network is based on the Internet protocol.

7. A communication system as set forth in claim 5, wherein said server, operating through said alternate network, selects a local communication path to said serving switch.

8. A communication system as set forth in claim 1, wherein said serving switch is local to said mobile data unit so that all calls made through said serving switch will be local calls.

9. A communication system as set forth in claim 1, wherein said assigning means assigns a temporary local directory number by selecting from a pool of numbers whose geographic base is said serving switch.

10. A telephone system, comprising:

a first land based hard-wired terminal;

a wireless data unit;

an alternate non-public switch telephone network controlled by at least one server;

a home location register addressable by said server;

a visited location register in selective communication with said home location register, said home location register including a database showing that said visited location register was last in communication with said wireless data unit;

a serving switch of a wireless communication system that was in communication with said wireless data unit and with said visited location register; said visited location register establishing a temporary local directory number for said serving switch and forwarding said temporary local directory number to said home location register for delivery to said server; and a hard-wired data unit, connoted to said alternate network and to the public switch telephone network, that uses said temporary local directory number to cal said serving switch to establish communication with said wireless data unit;

wherein a communication link is established between said first hard-wired terminal and said wireless data unit and wherein said first hard-wired terminal does not establish a communication link with a second hard-wired terminal.

11. A telephone system as set forth in claim 10, wherein said alternate network is an Internet protocol based network.

12. A telephone system as set forth in claim 10, wherein said alternate network includes a pool of hard-wired data units, said hard-wired data units dispersed at geographically remote locations with said server selecting one of said hard-wired data units using said temporary local directory number.

13. A telephone system as set forth in claim 12, wherein said server compares said temporary local directory number with a phone number assigned to each of said hard-wired data units on said public switch telephone network to determine said hard-wired data unit closest to said serving switch so as to establish a local call over the public switch telephone network.

14. A telephone system for communicating between a first land based hard-wired terminal and a mobile terminal, including a server in communication with said first land based hard-wired terminal and an Internet based protocol network and controlling the Internet based protocol network for determining a temporary local directory number of a last serving switch in contact with said mobile terminal and for using said temporary local directory number to establish communication between said first land based hard-wired terminal and said mobile terminal through use of said Internet based protocol network and a public switch telephone network, wherein said first land based hard-wired terminal does not communicate first with a second land based hard-wired terminal.

15. A telephone system as set forth in claim 14, wherein said temporary local directory number can come from a standard numbering plan whose numbers are normally dialable, or from a nonstandard numbering plan whose numbers are normally not dialable.

16. A method for providing an optimum connector path between a first hard-wired terminal and a mobile data unit comprising the steps of:

locating a serving switch of a wireless communication system that was last in contact with said mobile data unit;

assigning a temporary local directory number to said serving switch; and communicating with said mobile data unit without said first hard-wired terminal communicating with a second hard-wired terminal, including the sub-steps of connecting a hard-wired data unit to an alternate non-public switched telephone network and to the public switch telephone network at a location local to said serving switch, and dialing said temporary local directory number, and activating a connection with said serving switch.

17. A telephone system as set forth in claim 10, wherein said home location register is not associated with a home mobile switch.

18. A telephone system as set forth in claim 17, wherein said wireless data unit operates only in a roaming state.

19. A system for communicating between a hard-wired terminal and a wireless data unit, comprising:

a public switched telephone network;

an alternate non-public switch telephone network controlled by at least one server and containing at least one hard-wired data unit; and a wireless communication network for communicating with said wireless data unit, comprising:

a home location register addressable by said server but not associated with a home mobile switch;

a visited location register in selective communication with said home location register, said home location register including a database showing that said visited location register was last in communication with said wireless data unit;

a serving switch in communication with said wireless data unit and with said visited location register, wherein a temporary local directory number for said serving switch is established by said visited location register, said temporary local directory number being forwarded to said home location register for delivery to said server of said alternate non-public switch telephone network;

wherein said at least one hard-wired data unit on said alternate non-public switch telephone network is also in communication with said public switch telephone network, and wherein said at least one hard-wired data unit uses said temporary local directory number to call said serving switch to establish a communication path between said hard-wired terminal and said wireless data unit.

20. A communication system as set forth in claim 19, wherein said alternate non-public switch telephone network is an Internet protocol based network.

21. A communication system as set forth in claim 19, wherein said alternate non-public switch telephone network includes a pool of hard-wired data units, said hard-wired data units dispersed at geographically remote locations with said server selecting one of said hard-wired data units using said temporary local directory number.

22. A communication system as set forth in claim 21, wherein said server compares said temporary local directory number with a phone number assigned to each of said hard-wired data units on said public switch telephone network to determine said hard-wired data unit closest to said serving switch so as to establish a local call over the public switch telephone network.

23. A method of communicating between a hard-wired terminal and a wireless data unit, comprising the steps of:

initiating a call to said wireless data unit while upon an alternate non-public switch telephone network controlled by at least one server;

establishing communication between said alternate non-public switch telephone network and a wireless network, said wireless network including a home location register addressable by said server but not associated with a home mobile switch;

retrieving a temporary local directory number assigned to said wireless data unit by said wireless network, said temporary local directory number being relayed from said wireless network to said server of said alternate non-public switch telephone network;

selecting a hard-wired data unit from a pool of geographically disposed hard-wired data units by comparing characteristics of said temporary local directory number with characteristics of each phone number associated with each said hard-wired data unit; and establishing communication from said hard-wired terminal to said hard-wired data unit on said alternate non-public switch telephone network, and then on through said public switched telephone network, to said wireless data unit on said wireless network.

24. A method as set forth in claim 23, wherein said alternate non-public switch telephone network is based on the Internet protocol.

* * * * *